US012291895B2

(12) United States Patent
Longest et al.

(10) Patent No.: US 12,291,895 B2
(45) Date of Patent: May 6, 2025

(54) MOUNTING BRACE ASSEMBLY FOR A PULL HANDLE ASSEMBLY

(71) Applicant: NATIONAL SECURITY AND DOOR CORP., North Chesterfield, VA (US)

(72) Inventors: Mark Allen Longest, Blackstone, VA (US); Scott Childress, Powhatan, VA (US)

(73) Assignee: National Security and Door Corp., N. Chesterfield, VA (US)

( * ) Notice: Subject to any disclaimer, the term of this patent is extended or adjusted under 35 U.S.C. 154(b) by 685 days.

(21) Appl. No.: 17/515,897

(22) Filed: Nov. 1, 2021

(65) Prior Publication Data

US 2022/0056728 A1 Feb. 24, 2022

Related U.S. Application Data

(63) Continuation-in-part of application No. 16/675,498, filed on Nov. 6, 2019, now Pat. No. 11,187,007, which is a continuation-in-part of application No. 15/426,701, filed on Feb. 7, 2017, now Pat. No.
(Continued)

(51) Int. Cl.
*E05B 5/00* (2006.01)
*A47B 95/02* (2006.01)
*E05B 1/00* (2006.01)

(52) U.S. Cl.
CPC .............. *E05B 5/006* (2013.01); *A47B 95/02* (2013.01); *E05B 1/0015* (2013.01); *E05B 5/00* (2013.01)

(58) Field of Classification Search
CPC . E05B 1/00; E05B 1/0015; E05B 1/04; E05B 1/06; E05B 5/00; E05B 5/006;
(Continued)

(56) References Cited

U.S. PATENT DOCUMENTS 3,775,808 A * 12/1973 Little .................... E05B 1/0015 16/443
4,281,479 A * 8/1981 Daus ....................... E06B 3/827 49/503
(Continued)

FOREIGN PATENT DOCUMENTS

KR 101704005 B1 * 2/2017
KR 200490815 Y1 * 1/2020

OTHER PUBLICATIONS

Computer Generated Translation for KR 101704005 B1, Generated using https://worldwide.espacenet.com/ (Year: 2024).*

*Primary Examiner* — Alyson M Merlino
(74) *Attorney, Agent, or Firm* — Woods Rogers PLC; Timothy J. Bechen

(57) ABSTRACT

The present invention includes a door having a first horizontal frame member with a rear wall, a front wall, and an interior cavity extending between the rear wall and the front wall, the front side having an aperture granting access to the interior cavity and to the rear wall of the first horizontal frame member. The door includes a first brace member secured to form a first side of the bracing assembly. The door includes a first vertical frame member securely engaged to the first horizontal frame member. Therein, the door includes a second brace member secured to the first side of the first vertical frame member and the first horizontal frame member to form a second side of the bracing assembly. The door includes a mounting assembly affixable within the bracing assembly. Whereupon, a pull assembly is affixable to the mounting assembly.

16 Claims, 12 Drawing Sheets

Related U.S. Application Data

10,501,961, which is a continuation of application No. 14/816,378, filed on Aug. 3, 2015, now Pat. No. 9,598,877.

(58) Field of Classification Search
CPC . E05B 9/08; E05B 9/082; A47B 95/02; A47B 2095/026; A47B 2095/027; A47B 2095/024; F24C 15/024; E06B 2003/7046
See application file for complete search history.

(56) References Cited

U.S. PATENT DOCUMENTS

| | | | | | |
|---|---|---|---|---|---|
| 4,456,290 | A * | 6/1984 | Gross | E05B 65/0025<br>292/DIG. 53 |
| 4,696,174 | A * | 9/1987 | Marks | E05B 9/08<br>70/462 |
| 4,744,126 | A * | 5/1988 | Bisbing | A45C 13/26<br>16/443 |
| 5,074,009 | A * | 12/1991 | Simonton | A47B 95/02<br>16/416 |
| 5,845,439 | A * | 12/1998 | Hendley | E06B 1/30<br>49/501 |
| 6,282,753 | B1 * | 9/2001 | Hochmuth | E05B 1/0015<br>292/336.3 |
| 6,581,333 | B2 * | 6/2003 | Kimball | E05B 9/02<br>49/504 |
| 6,688,063 | B1 * | 2/2004 | Lee | E05B 9/08<br>70/141 |
| 8,616,592 | B2 * | 12/2013 | Kitada | E05B 5/00<br>292/336.3 |
| 2011/0025074 | A1 * | 2/2011 | Reznar | E05B 5/00<br>292/336.3 |

* cited by examiner

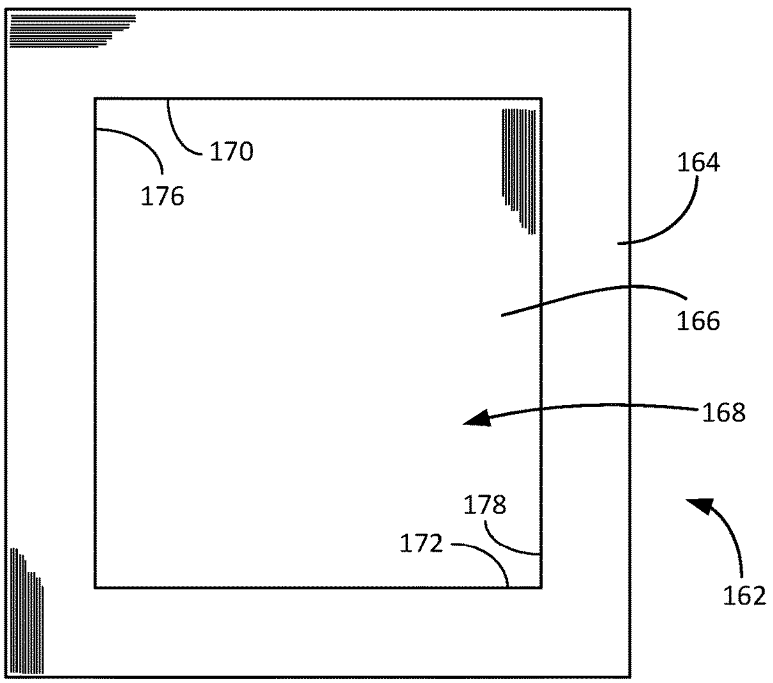
FIG. 15
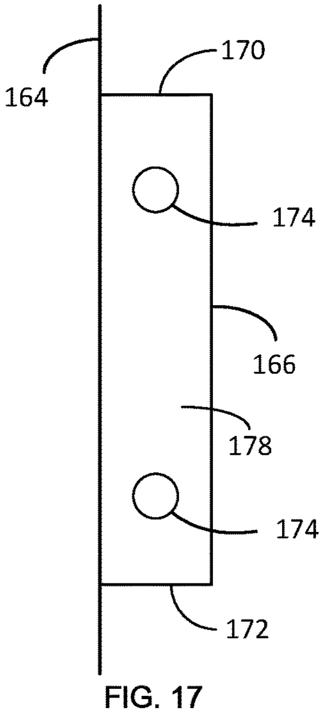
FIG. 17
FIG. 16
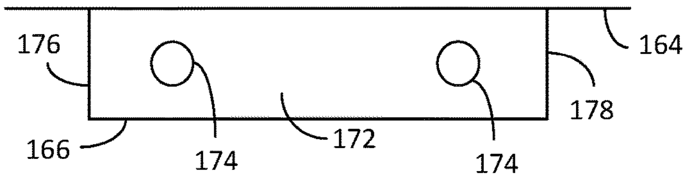
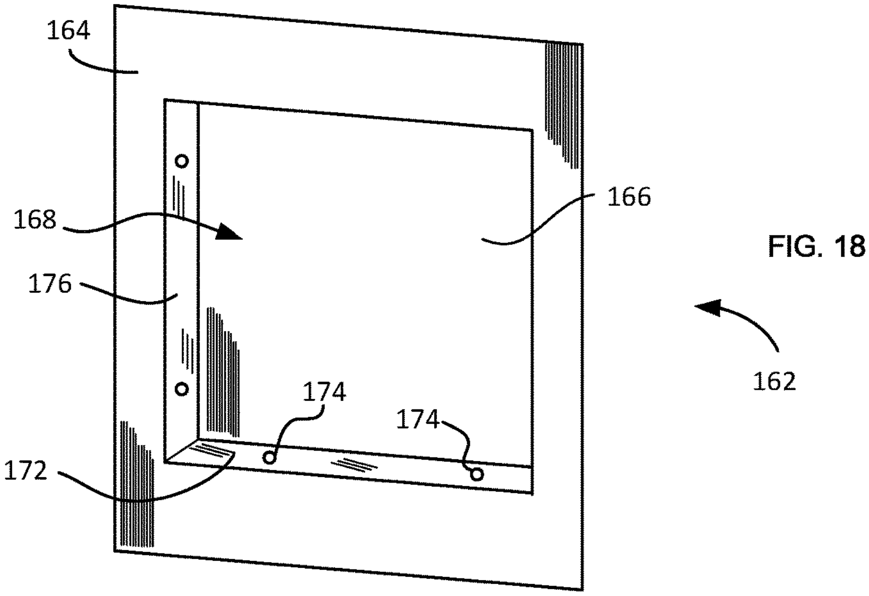
FIG. 18

MOUNTING BRACE ASSEMBLY FOR A PULL HANDLE ASSEMBLY

RELATED APPLICATIONS

The present application is a continuation-in-part of, and claims priority to, U.S. patent application Ser. No. 16/675,498 filed Nov. 6, 2019, entitled "Pull Handle Assembly and Door Cover," which is a continuation-in-part of, and claims priority to, U.S. patent application Ser. No. 15/426,701 filed Feb. 7, 2017, entitled "Flush Pull Door Handle," now U.S. Pat. No. 10,501,961, which is a continuation of, and claims priority to, U.S. patent application Ser. No. 14/816,378 filed Aug. 3, 2015 entitled "Flush Pull Door Handle," now U.S. Pat. No. 9,598,877.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present application relates to a flush pull door handle and more specifically to a flush pull door handle and assembly affixable and readily removable from a door, with a mounting cover affixed over an existing door.

BACKGROUND

Door handles primarily consist of knobs, arms or similar shapes. These types of handles have varying benefits, including reducing difficulties for persons with disabilities to use the door. Most public buildings, including schools, government buildings, corporate offices, etc. have pull handles that extend out from the door.

It is also very common for large entrance areas to include double-doors with mirrored door handles extending out from the door. While on the interior portion of the door, there are usually push-bars or emergency exit bars based on fire code requirements. The technology relating to the existing outwardly extending door handles is well known and well established in the marketplace.

Problems can arise from outwardly extending door handles, including significant safety concerns. For example, it is possible for a malfeasant actor to apply chains to the door via the handles, preventing the doors from being opened from the inside. The door handles, extending out from the door, provide the perfect hooking mechanisms to grasp chains or other items causing the doors to remain unopenable. Such events have occurred in at least one mass casualty on a university campus, students having lost their lives in part from being trapped from chains around door handles preventing escape.

A flush pull handle mounted on a door provides a simple solution to prevent doors from being held secured together using chains or other means. The problem is that flush pull handle technology is extremely limited. Current flush pull handles are physically molded into the doors themselves. For example, U.S. Pat. No. 6,282,753 describes a flush mount door handle that is recessed within a doorframe, but this door handle is physically mounted into the door such that the handle cannot be removed or changed without dismantling the actual door. This prior art flush pull handle focuses on the novel design of having an angled back portion to allow cleaning.

Another example of limiting flush pull handle prior art is U.S. Pat. No. 5,355,554 showing a pull handle that can be inserted into an existing door. While this allows for minor modifications to the door, this prior art door handle further evidences the limitations of needing to modify or take apart the door to install and remove the door handle. In this system, the door handle is secured to the door itself while the door is being manufactured. This system then requires the manufacturing of the door and the pull handle to be done concurrently, as well as limiting the door to always require that pull handle. If the handle needs repair or replacement, the door itself must be taken apart or the whole door is then replaced.

Existing safety concerns note the value of a flush pull door handle to prevent the doors from being improperly secured together. But, the existing prior art require manufacturing of the door and the handle together, thus requiring a special manufacture of the door. Similarly, the existing technology, by combining the door and the handle into a single manufactured unit, inhibits removal and/or replacement of the handle.

Additionally, a bracing assembly must be secured within the door frame, providing security for the door but also rigidity for pulling forces when opening a door. As such, there exists a need for a flush pull door handle that can be affixed into a door assembly, as well as structural mounting as part of the door assembly.

BRIEF DESCRIPTION

The door, as described herein, includes structure for affixing a flush pull door handle therein. The door includes a first horizontal frame member having a rear wall, a front wall, and an interior cavity extending between the rear wall and the front wall. The front side has an aperture therein granting access to the interior cavity and to the rear wall of the first horizontal frame member.

In the door, a first brace member is secured within the interior cavity of the first horizontal frame member, the first brace member including at least one fastener engagement element. The first brace member forms a first side of the bracing assembly.

The door includes a first vertical frame member having a first side with engagement means for secure engagement to the first horizontal frame member. The door additionally includes a second brace member secured to the first side of the first vertical frame member such that when the first vertical frame member engages the first horizontal frame member, the second brace member is secured within the interior cavity. Therein, the second brace member forms a second side of the bracing assembly. The second brace member includes at least one fastener engagement element.

Therein, the door includes a mounting assembly with multiple fastener elements. Upon assembly, the mounting assembly is affixed within the interior cavity of the first horizontal frame member by engaging the plurality fastener elements with the fastener engagement elements of the first brace member and the second brace member.

The door may further include a pull assembly including an assembly interior portion having a first interior side and a second interior side, the first interior side having at least one flange mount opening. The pull assembly includes an assembly face having a handle portion flush with the assembly face and protruding across at least a portion of the assembly interior portion for allowing a pulling action on the pull handle. The pull assembly mounts in the mounting assembly within the interior cavity of the first horizontal frame member. Thus, when assembled, the door includes the pull assembly structurally secured to the door via the mounting assembling and the bracing assembly composed of the brace members within the first horizontal frame.

In one embodiment, the first horizontal frame member includes a ridge element disposed within the interior portion. The ridge element aligns the positioning of the brace members within the interior portion.

For fully assembly of the door, door may additionally include a second vertical frame member, as well as a second horizontal frame member disposed at a top end of the door secured between with the first vertical frame member and the second vertical frame member and a third horizontal frame member disposed at a lower end of the door secured between with the first vertical frame member and the second vertical frame member.

The structure of the door can also include at least one skin affixed over the first vertical frame member, the second vertical frame member, the first horizontal frame member, the second horizontal frame member, and the third horizontal frame member. This skin includes an aperture aligning with the aperture on the front side of the first horizontal frame member and allowing for inserting the mounting assembly and/or the pull assembly.

In one embodiment, the frame members are composed of aluminum. In other embodiments, the frame members can be composed of any suitable material allowing for rigidity.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 15 is a front view illustrating one embodiment of a mounting brace;

FIG. 16 is a top view and/or bottom view illustrating one embodiment of a mounting brace;

FIG. 17 is a side view illustrating one embodiment of a mounting brace;

FIG. 18 is a perspective view illustrating one embodiment of a mounting brace;

DETAILED DESCRIPTION

Figure 1:
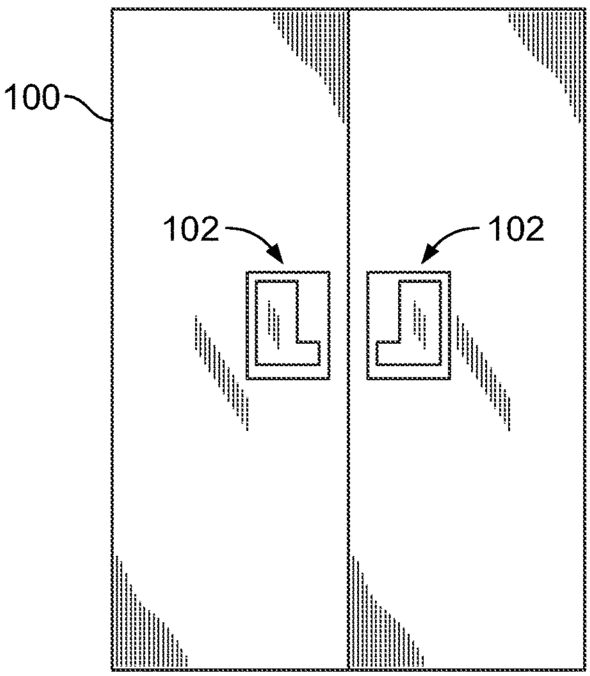
FIG. 1 is a front view of a door with flush pull handles installed thereon.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

FIG. 1 illustrates a front view of a door 100 having the flush pull handles 102 installed thereon. As described in greater detail below, the flush pull handles 102 are flush with the door 100, with an interior portion allowing for grasping the pull portion of handle and opening the door. The pull handles 102 are custom interlocking, fully serviceable chain resistance security pulls. The handles 102 are serviceable by being readily removable without having to disassemble the door 100. Moreover, the pulls mount within the door, not through the door, such that if the pull handle if removed, there is no access to the other side of the door or any of the door locking mechanisms. Similarly, the pull handles 102 can be installed on a standard door having an internal bracing or bracket component, but does not require manufacturing of the handle into the door, thereby simplifying the door 100 manufacturing and assembly processes.

The pull handle 102 of FIG. 1 includes a mounting assembly and a pull assembly, where the mounting assembly is mounted to the door 100 and the pull assembly is therein mounted to the mounting assembly.

Figure 2:
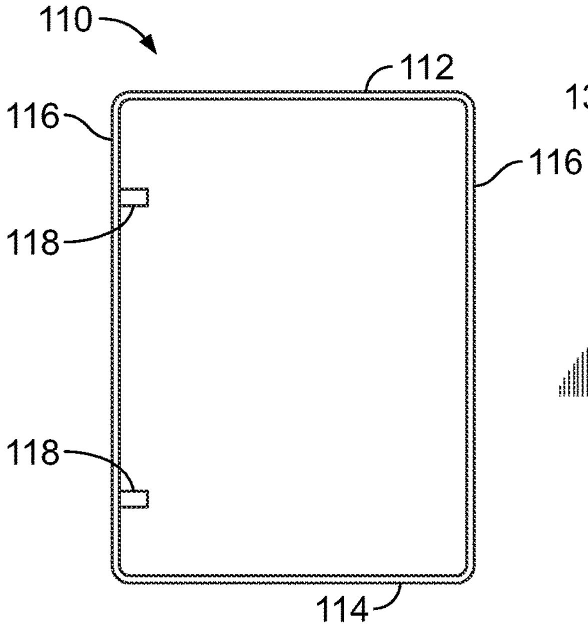
FIG. 2 is a front view of one embodiment of a mounting assembly.

FIG. 2 illustrates a front view of one embodiment of a mounting assembly 110. The mounting assembly is rectangular in shape having a top portion 112, bottom portion 114 and two side portions 116. In this embodiment, two mounting flanges 118 are disposed on one of the side portions 116. The mounting assembly 110 further includes fastener openings, not visible in the front view of FIG. 2, but described in greater detail below. As illustrated, the assembly 110 includes slightly curved edges but may contain squared edges.

Figure 3:
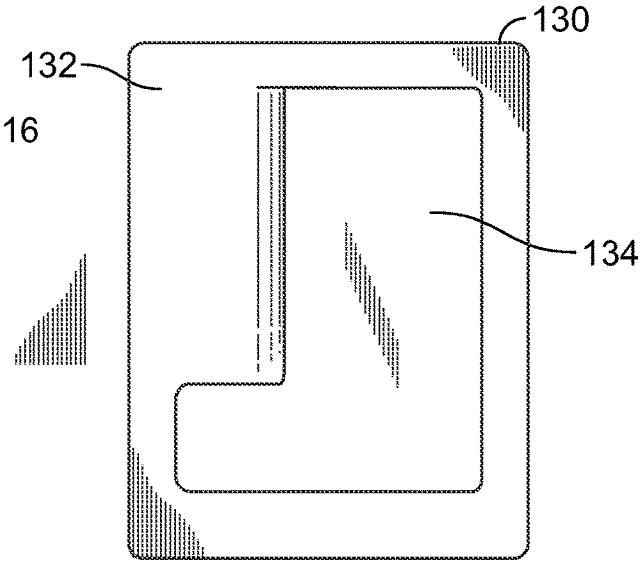
FIG. 3 is a front view of one embodiment of a pull assembly.

FIG. 3 illustrates a front view of one embodiment of a pull assembly 130 having an assembly face 132 and an assembly interior 134. As also described in further detail below, the assembly face 132 includes a handle portion extending across a portion of the assembly interior 134, allowing for pull access to the door such that a person can grasp the extending portion of the assembly face 132 to open the door.

In one embodiment, the pull handle portion of the assembly face 132 extending over the interior portion includes a curved edge, such as in one embodiment an 18 degree offset allowing for improved grip of the handle. For example, the pull handle portion allowing for user to grab the pull handle can be curved or designed to not required tight grasping, pinching or twisting for opening the door, such as may be in full compliance with any local, state or Federal guidelines.

It is recognized that the illustration portion of the face 132 of FIG. 2 represents one of any number of suitable embodiments for the shape of the face, such as for example inverting the face 132 relative to a left door or a right door. By way of example, FIG. 1 illustrates the inverted door handles for both a left door pull and a right door pull.

Figure 4:
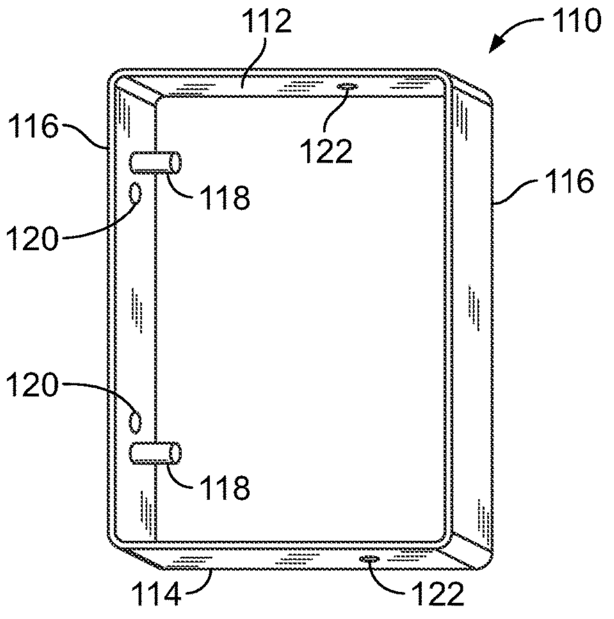
FIG. 4 is a perspective view of one embodiment of a mounting assembly.

For further clarification of the mounting assembly 110, FIG. 4 illustrates a perspective view of one embodiment of the mounting assembly 110. In this embodiment, the top portion 112 and the bottom portion 114 include mating elements 122 for receipt of a fastener securing the pull assembly to the mounting assembly 130. In one embodiment, the mating elements 122 are threaded holes to receive fasteners as described in further detail below. The side portion 116 further includes a plurality of fastener openings 120 in this embodiment between the mounting flanges 118.

As described in further detail below, a fastener (not shown in FIG. 4) is inserted through the fastener openings 120 on the side portion 116 to secure the mounting assembly 110 to a bracing assembly inside a door. In the embodiment of FIG. 4, the fastener openings 120 are on the one side portion, but it is recognized they may additionally be installed on the opposing side portion 116 for further secure mounting. Whereas, in this embodiment, the pulling action to open a door generates a force relative via the mounting flanges 118, therefore the bracing is most efficiently secured near the flanges 118, but such securing location is not expressly limited to the side having mounting flange(s) 118.

Figure 5:
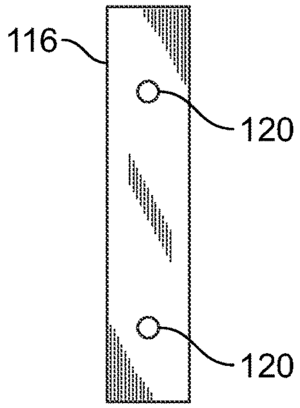
FIG. 5 is a side view of one embodiment of a mounting assembly.
Figure 6:
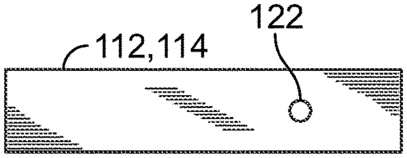
FIG. 6 is a top view and/or a bottom view of one embodiment of a mounting assembly.

For further illustration, FIG. 5 illustrates an exterior side view of the side portion 116. The exterior view illustrates the fastener openings 120. FIG. 6 illustrates an exterior side view of one embodiment of the top portion 112 and/or bottom portion 114. In this embodiment, the top portion 112 and the bottom portion 114 mirror each other with mating elements 122.

It is recognized that varying embodiments may include multiple mating elements 122 solely on the bottom portion or the top portion. Similarly, varying embodiments may include different the number and/or placement of fastener openings on the side portion 116, such as for example a single fastener opening 120 in the center of the side portion 116 instead of two openings 120 near the mounting flanges 118. As described further below, in this embodiment for the top portion 112 and the bottom portion 114, the mating elements 122 allow fasteners to engage the pull assembly (130 of FIG. 3) into the mounting assembly 120. It is recognized that varying embodiments allow for varying the number and/or locations of the fastener openings 120 and/or mating elements 122 such that the above-described embodiments are exemplary and limiting in nature.

Figure 7:
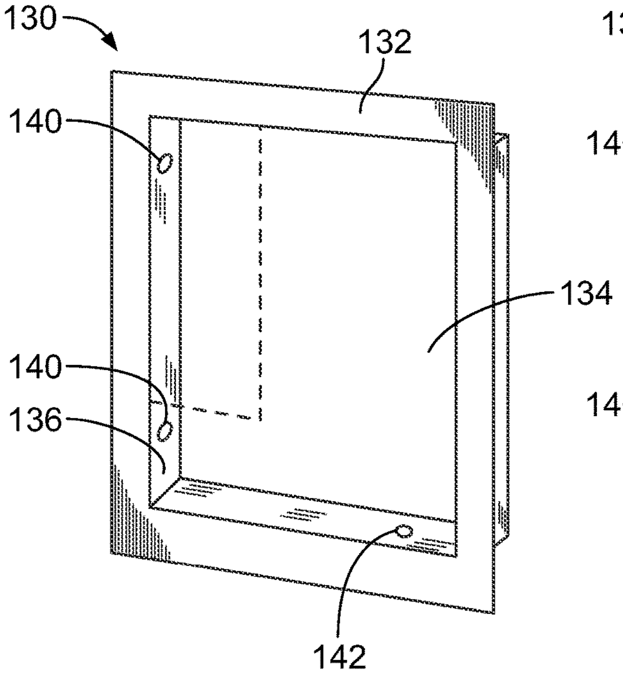
FIG. 7 is a perspective view of one embodiment of a pull handle.

FIG. 7 illustrates a first perspective view of one embodiment of the pull assembly 130. In this illustrated embodiment, the extending portion of the assembly face 132 is omitted to illustrate underlying elements. The pull assembly 130 includes the assembly face 132, assembly interior 134, a first interior face 136 and a second interior face 138 (visible in FIG. 8).

The first interior face 136 includes a plurality of flange mount openings 140. As described below, the flange mount openings 140 are positioned to accept the mounting flanges 118 of the mounting assembly 110 of FIG. 4.

The assembly interior 134 further includes fastener openings 142, whereby this embodiment shows the bottom fastener opening 142.

Figure 8:
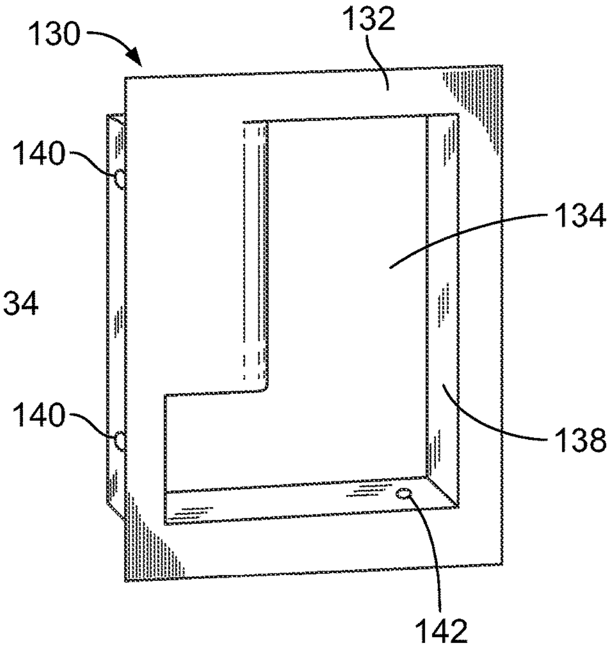
FIG. 8 is another perspective view of one embodiment of a pull handle.

FIG. 8 illustrates the second perspective view of this embodiment of the pull assembly 130. Illustrated herein, the flange mount openings 140 extend through the interior portion 134 and the fastener opening 142 is on the bottom edge of the interior portion 134. While not visible in FIG. 8, one embodiment includes a second fastener opening on the top face of the interior portion 134, as better illustrated in FIG. 11. In the embodiment of FIG. 8, the second interior side 138, illustrated herein having no openings, but being a solid interior portion. Similar to the varying of the position and number of mounting flange(s) 118 and mating elements 122 of the mounting assembly 110, the number and position of flange mount openings 140 and fastener openings 142 may be accordingly varied.

Figure 9:
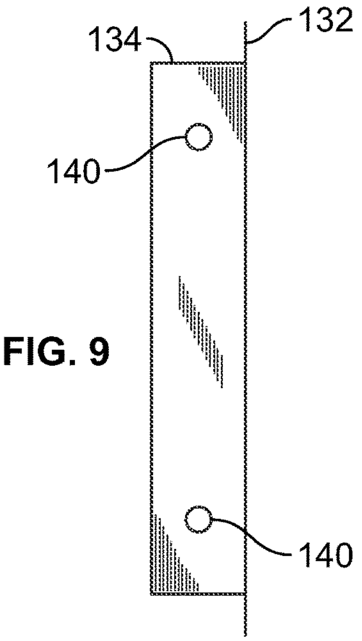
FIG. 9 is a side view of one embodiment of a pull handle.
Figure 10:
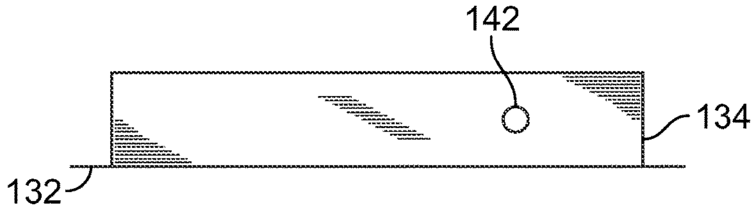
FIG. 10 is a top view of one embodiment of a pull handle.
Figure 11:
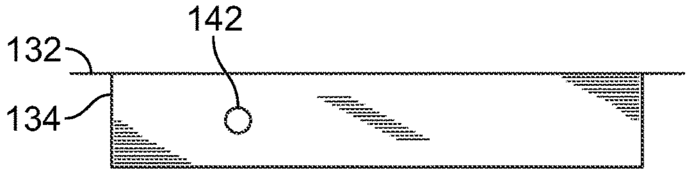
FIG. 11 is a bottom view of one embodiment of a pull handle.

FIGS. 9-11 illustrate additional views of the pull assembly 130. FIG. 9 is a side view illustrating the face 132 extending outward from and beyond the interior portion 134. The interior portion 134 extends back from face 132, allowing for hand access to grab the extending face portion and pull on the door handle to open the door. FIG. 9 also illustrates the placement of the flange mount openings 140 in this embodiment.

FIG. 10 is a bottom view illustrating the placement of the fastener opening 142 relative to the assembly face 132 and the assembly interior 134. Also visible is the overly or extension of the face 132 beyond the interior 134. FIG. 11 is a top view providing similar illustration of this embodiment of the pull assembly with the fastener opening 142, assembly face 134 and assembly interior 134.

In one embodiment, the flush pull handle may be constructed with an architectural finish, such as having a polish finish consistent with commercial-grade esthetics. The handle may be composed of 11-gauge stainless steel, but any suitable material recognized by one skilled in the art in within the scope of the present invention.

In one embodiment, the mounting assembly 110 has a general dimension of a width of 5.75 inches, a height of 8.32 inches and a depth of 1.5 inches. The mounting flanges 118 extend out 1.12 inches from the assembly 110, centrally disposed within the sidewall of the assembly, each flange disposed 1.74 inches from the top edge and bottom edge, respectively. The pull assembly has a width of 6.3 inches, height of 9.47 inches and depth of 1.62 inches. The curved portion of the handle for grasping has a distance of 0.38 inches and a bottom gap between the handle extending portion and the bottom of the interior portion is 2.29 inches.

Figure 12:
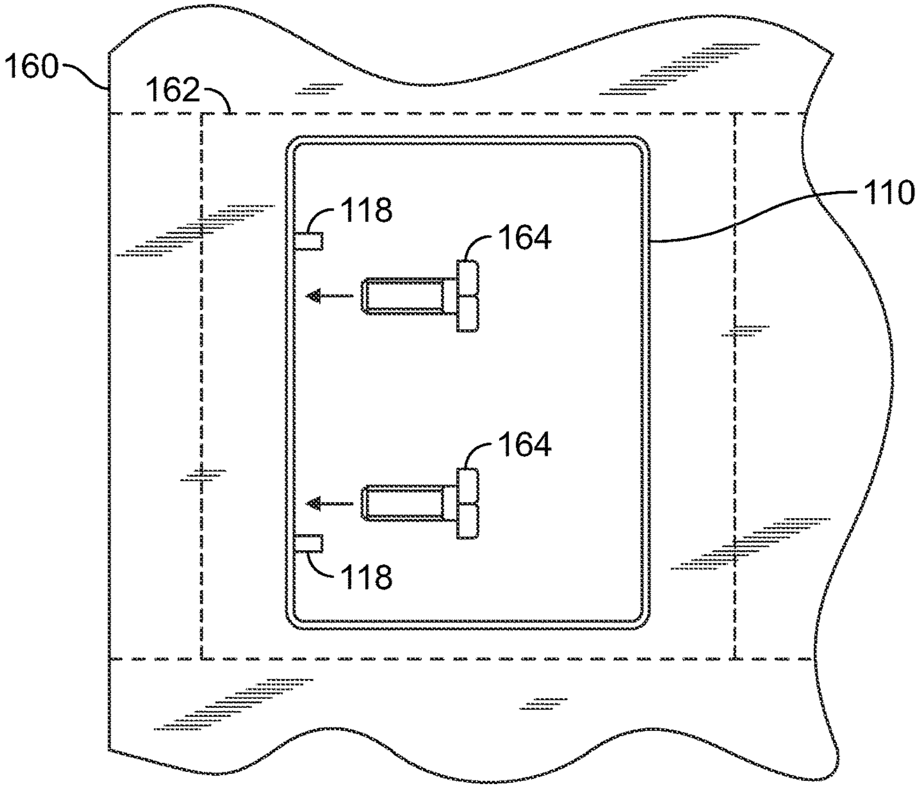
FIG. 12 is a front view illustrating one embodiment of mounting assembly installation.

It is recognized that the above measurements, dimensions and materials are exemplary in nature of one embodiment. These measurements, dimensions and materials are not limiting in nature and do not restrict or otherwise limit the scope of the flush pull handle described herein as the measurements, dimensions and materials may be modified or adjusted as recognized by one skilled in the art.

Where FIGS. 2-11 illustrate one exemplary embodiment of mounting assembly 110 and pull assembly 130, FIG. 12 illustrates one embodiment of securing the mounting assembly 110 relative to a door 160. The door 160 may be any suitable door, including for example but not limited to a metal, wood, or aluminum door. The door 160 includes an interior bracing assembly 162 capable of receiving the mounting assembly 110. This bracing assembly 162 may be a strip of bracing material having the proper strength and rigidity to fit within the interior of the door and having an opening commensurate with the size of the mounting assembly 110. In one embodiment, the bracing assembly 162 may be a continuous piece of metal or aluminum or any other suitable material extending lengthwise across a portion of the door. In another embodiment, the bracing assembly may be a bracket assembly secured into the interior, such as the vertical channel 162. For example, in one embodiment, the bracket assembly may be welded into place prior to finishing the exterior or skin of the door.

In securing the mounting assembly 110 to the bracing assembly 162, the mounting assembly 110 is placed within a receiving portion. When received, a plurality of fasteners are inserted through the fastener openings (120 of FIG. 4) for securing the mounting assembly 110 to the bracing assembly 162. In this embodiment, the fasteners 164 are screws and are placed just below the mounting flanges 118. It is recognized that any other suitable fastener may be utilized and the embodiment of screws is not limiting or exclusive for securing the mounting assembly 110 to the bracing assembly 162. For examples, fasteners may include nails, rivets, screws, welds, etc.

In another embodiment, the mounting assembly may be affixed using non-fastener means, but any other suitable securing means. For example, the mounting assembly may be affixed in the door using welds, adhesives, glues, snap-fit, or any other suitable means recognized by one skilled in the art.

Figure 13:
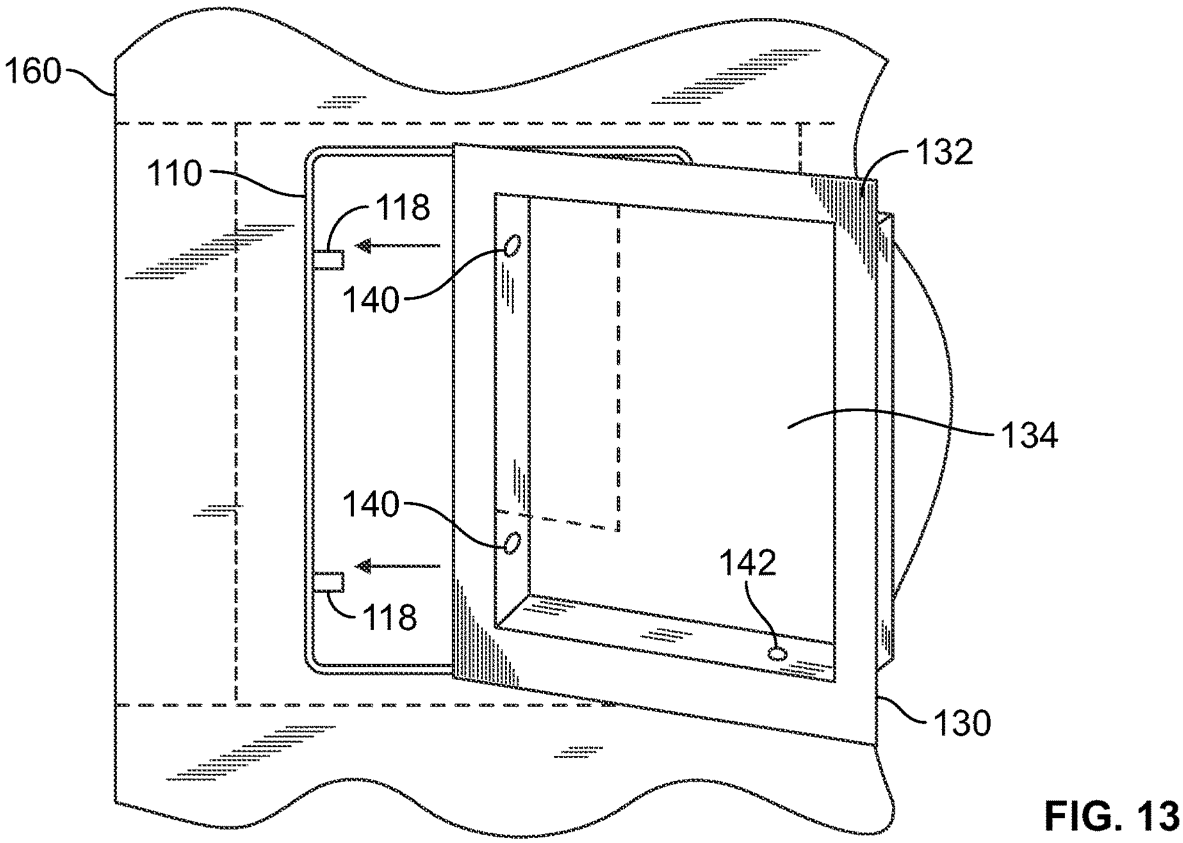
FIG. 13 is a perspective view illustrating one embodiment of pull handle assembly.

FIG. 13 illustrates the mating of the pull assembly 130 into the mounting assembly 110 as secured within the door 160. Similar to FIG. 7, a portion of the assembly face 132 is removed to illustrate the alignment of the mounting flanges 118 with the flange mount openings 140 of the pull assembly 130. The interior portion 134 fits within the mounting assembly 110 and the assembly face 132 extends around and covers up the mounting flange 118. Also visible in FIG. 13, the fastener opening 142 is located in the interior portion 134. As the pull assembly 130 is fitted into the mounting assembly 110 and the mounting flanges 118 extend through the flange mount openings 140, the pull assembly 110 is then flush mounted against the door 160. The assembly face 132 occludes the mounting assembly 110.

Figure 14:
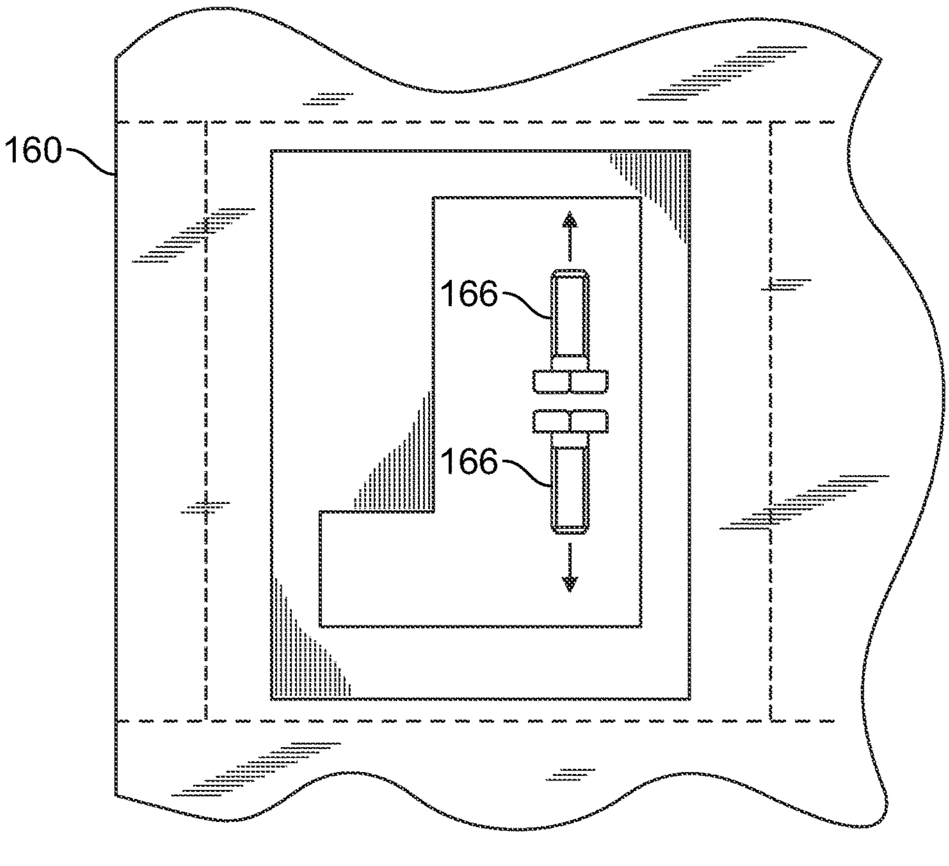
FIG. 14 is a front view illustrating one embodiment of pull handle installation.

FIG. 14 illustrates the final step in the flush mount assembly with the placement of fasteners 166 into fastener openings (142 of FIG. 13). Therefore, the pull assembly 130 is secured to the mounting assembly 110 via the flanges 118 and is secured to the door by the fasteners 166 passing through the fastener openings (142 of FIG. 13) and into the mating elements of the mounting assembly (122 of FIG. 4). In this embodiment, the mounting flanges are flush with the side of the interior portion and thus not visible.

In further extension of the above-described embodiments, FIGS. 15-18 provide further illustration of the bracing assembly. Whereas the above embodiment of FIGS. 12-14 relate to a post-manufacturing embodiment, FIG. 15-18 provides for new construction embodiments based on the available access to the door interior.

FIG. 15 illustrates a front view of the mounting brace 162, also referred to as a brace assembly, previously shown in relief in FIG. 12. The mounting brace 162 includes a front face 164 and rear wall 166 of cavity 168. The cavity 168 is further defined by a plurality of interior walls: top wall 170, bottom wall 172, and side walls 176, 178.

FIG. 16 illustrates a bottom view of the mounting brace 162, illustrating the front face 164 and rear wall 166. Further visible is the outer side of the bottom wall 172. Defining the cavity 168 of FIG. 15 are the side walls 176 and 178. Also visible in FIG. 16, the bottom wall 172 includes one or more apertures 174, where the apertures 174 allow for engaging the mounting assembly into the mounting brace 162 as described herein.

It is noted that in one embodiment, the mounting brace 162 has a mirrored shape and design, such that where FIG. 16 illustrates a bottom view, a top view of the mounting brace 162 would look identical but for the replacement of the bottom wall 172 with the top wall 170, as well as alternating side wall 176 and 178 designations.

FIG. 17 illustrates a side view of the mounting brace 162, including the front face 164, rear wall 166 and outer side of side wall 178. The top wall 170 and the bottom wall 172 further define the cavity 168 of FIG. 15. Apertures 174 are also visible in the side interior wall 176.

It is noted that in one embodiment, the mounting brace 162 is has a mirrored shape and design, such that where FIG. 17 illustrates a first side view, a second side view from the opposite direction would look identical but for the replacement of the side wall 176 with the side wall 178, as well as alternating top wall 170 and bottom wall 172 designations.

FIG. 18 illustrates a perspective view of the mounting brace 162. In FIG. 18, the interior portion of the cavity 168 is visible, as defined by the various interior walls 172 and 176, as well as the rear wall 166, top wall (not shown) and other side wall (not shown). Additionally visible in FIG. 18, the interior walls 172, 176 include the one or more apertures 174. Where the aperture provides for secure fastening, the aperture may include adding elements allowing for secure fastening. For example, if the fastener is a screw, the aperture may include threads for mating the screw. Other examples for fastener mating in conjunction with one or more apertures are known within the art and included within the scope herein.

In one embodiment, the mounting brace 162 is mirrored in the vertical plane and in the horizontal plane. Therefore, during installation, the mounting brace does not require a specific installation alignment. In this embodiment, the location of the apertures on the side interior walls mirror each other and the location of the apertures of the bottom interior wall and the top interior wall also mirror each other. Similarly, the dimensions between an outer edge of the front face and the cavity defined by the interior walls are also mirrored both on the horizontal and vertical planes.

In one embodiment, the mounting brace may therein be securely affixed to the door during the manufacturing process. As used herein, during the manufacturing process includes, but is not limited to, the assembly of the door prior to the application of a skin or other outer shell.

During the manufacturing process, direct access to the interior portion of the door is made available, allowing for a further degree of stability in installation. For example, with full access to the interior portion of the door, the mounting brace may be directed secured within the interior of the door. One such securing technique may include welding the mounting the brace directly into the door interior. Another technique may include an adhesive or glue application. Another technique may include one or more fasteners to an interior door frame. Whereas it is recognized that other securing techniques are within the scope of the present invention and incorporated herein.

The mounting brace 162, in this embodiment, is disposed within the door frame or shell interior during the manufacturing process. The mounting brace 162 is then enclosed within the door skin, leaving the inner cavity 168 exposed. The cavity 168 thus allows for mating with the mounting assembly as described above, such as with reference to FIG. 12.

As noted above, the mounting assembly therein allows engagement with the pull assembly. In the first instance, the mounting assembly (110 of FIG. 4) is secured within the bracing assembly 162. The pull assembly (130 of FIG. 7) is then mounted into the mounting assembly, providing for a flush pull door handle.

In the embodiments described herein, the flush pull handle does not include any interior latching or door locking mechanisms. Rather, the flush pull handle works with doors having other security means for monitoring ingress and egress. For example, the door with the flush pull handle may include a security card or other type of security access that when activated released a latching mechanism to allow the door to open from the flush pull handle side. Similarly, the flush pull handles may be on the opposing side of a door having push bars that allow for pushing the door open from the opposite side when the door is locked. In one embodiment, the flush pull handle operates with doors typically remaining unlocked and generally accessible during normal hours, such as doors found in a school, library, government office, etc.

As noted above, the flush pull handle being mounted via the mounting assembly into the cavity 166 of the mounting brace 162 of the door prohibits access to the other side of the door. Similarly, if the pull handle is removed, there is no access to any of the locking mechanisms of the door, further enhancing the safety of the flush pull handle. In another embodiment, the mounting assembly 110 may include a backing, such backing can be a means to affix the mounting assembly into the door itself. The backing may include a material or coating providing for a fire-rating of the door. Similarly, such backing and/or coating can be affixed to the pull handle, thus allowing for further enhanced safety, in this embodiment for meeting fire-rating or fire code requirements.

A further embodiment provides for installation and mounting of the door pull assembly within a pre-existing door. FIGS. 1-14 relate to modifying existing doors and FIGS. 15-18 relate to new construction, installing elements of the door pull assembly prior to wrapping a skin around the door. By contrast, FIGS. 19-25 illustrate further embodiments for modifying existing doors, such as converting existing doors with an external pull handle or a door knob to use the pull assembly described herein.

Figure 19:
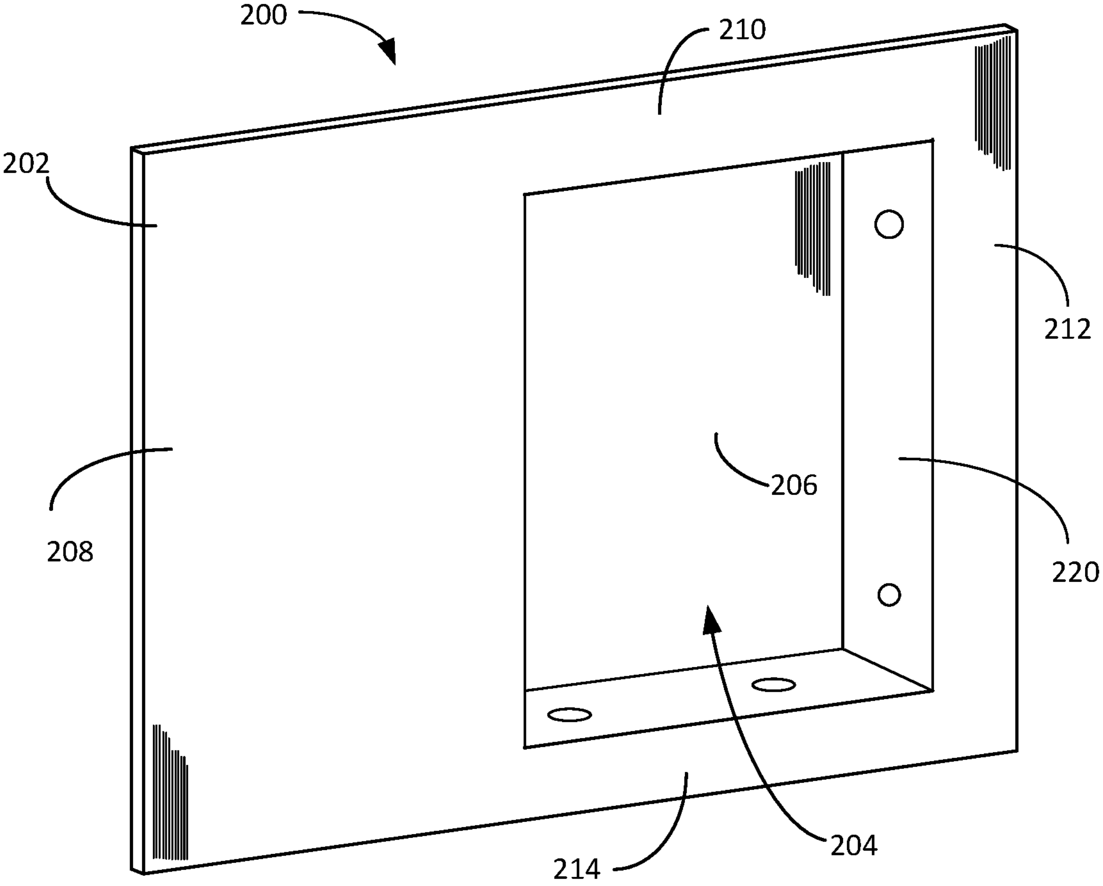
FIG. 19 is a perspective view illustrating one embodiment of an external mounting brace.

FIG. 19 illustrates a front view of one embodiment of an external mounting brace 200. The external mounting brace 200 includes a front face 202 and an enclosed cavity 204. The external mounting brace 200 includes similar features and elements to the mounting brace 162 of FIG. 15. Where the mounting brace 162 of FIG. 15 fits within and under the skin of the door, the external mounting brace 200 affixes over the door skin and into an interior portion of the door.

The external mounting brace 200 includes a flat surface 206 within the enclosed cavity 204. As described in greater detail below, the external mounting brace 200, once affixed to the outside of the door, provides for installation of a mounting assembly and a pull assembly therein.

The front face 202 includes outwardly extending flanges 208, 210, 212, 214, spread out from the enclosed cavity 204. The flanges 208-214, in this embodiment, make up the front face 202.

For installation to a door, the backside of the front face 202 is secured against the outer portion of the door. Prior to installation, a section of the door is removed along with any interior bracing or insulation elements. The removed section allows for insertion of the cavity 204 within the interior portion of the door.

Figure 20:
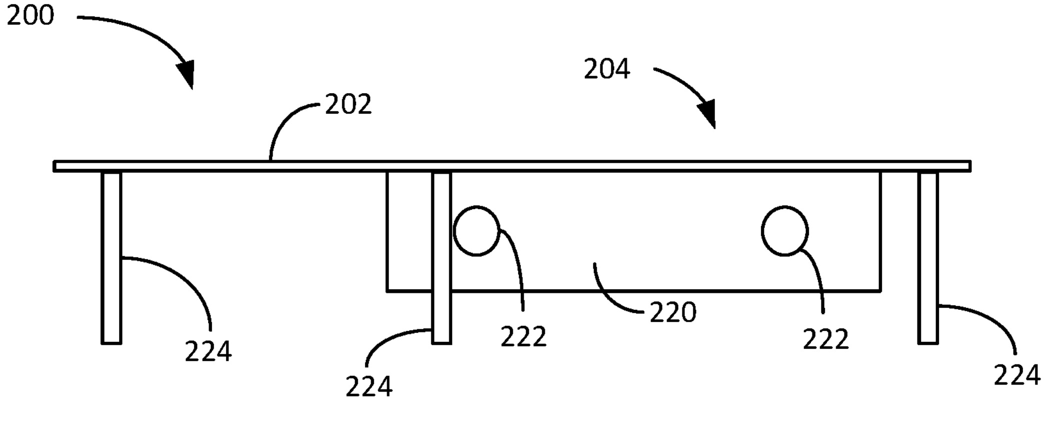
FIG. 20 is a bottom view (or top view) illustrating one embodiment the external mounting brace.

For further illustration, FIG. 20 illustrates a side view of the mounting brace 200 with the front face 202 on the upper side and the cavity 204 extending downward from the front face 202. The cavity 204 (not directly visible) is defined by walls 220. Visible by combination of FIG. 20 and FIG. 21 described below, the walls 220 form a rectangle extending below the front face 200.

FIG. 20 illustrates the exterior side of the enclosed cavity 204 of FIG. 19. The wall 220 of the cavity 204 includes fastener mating elements 222. These elements 222 can be any suitable elements allowing for or facilitating engagement, such as apertures or threaded apertures by way of example. As described herein, when the mounting assembly (116 of FIG. 4) is inserted into the external mounting brace, one or more fasteners can be engaged with or through the fastener mating elements 222 to secure the mounting assembly within the external mounting brace.

Additionally, the external mounting brace 200 includes a plurality of mounting channels 224 extending outward from the mounting brace 200 perpendicular to the front face 200. The mounting channels 224 illustrate one embodiment of any suitable embodiment for a securing means to affix the mounting brace 200 to the front side of the door. For example, one embodiment may include the mounting channels 224 including threads or similar elements for gripping or securing a threaded screw, bolt, or other fastener type received through a back side of the door. The mounting channels 224 are not expressly limiting in types or designs for securing means, wherein to one skilled in the art any suitable form of securing means may be used and incorporated herein. For example, one embodiment many include glue or other type of adhesive to secure the external mounting brace to the door. For example, another embodiment may include a threaded screw, bolt, or other male connector connected to the external mounting brace and a female connector feed through the rear side of the door. Therein, the securing means may be any suitable means for securing the external mounting brace to the front side of the door.

The mounting brace 200 and the back plate 230 can be made of any suitable material providing for integrity and strength consistent with descriptions herein. For example, in one embodiment, the brace 200 and back plate 230 can be made from a cold rolled steel. In another embodiment, the brace 200 and back plate 230 can be made from stainless steel. In one embodiment, the brace 200 and back plate 230 can include one or more coatings, including anti-microbial and/or graphics designs.

The mounting brace 200 and the back plate 230 can be made of same or different gauge materials. In one embodiment, the mounting brace 200 is made of an 11 gauge cold rolled or stainless steel. In one embodiment, the back plate 230 can be made of 18 gauge aluminum or stainless steel. The above embodiments are exemplary in nature and not expressly limiting, whereby the gauge and materials can be any suitable gauge and material as recognized by one skilled in the art.

Figure 21:
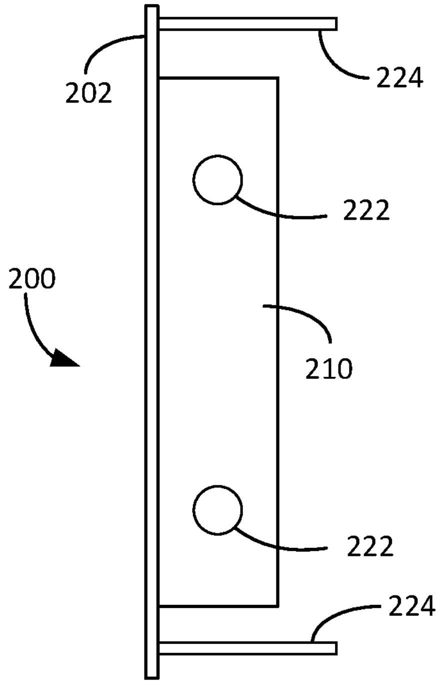
FIG. 21 is a side view illustrating one embodiment of the external mounting brace.

For further illustration, FIG. 21 illustrates a side view of the external mounting brace 200. The side view illustrates the front face 202 and mounting channels 224 extending therefrom. In this embodiment, fastener mating elements 222 can also be disposed on the walls 220, the walls 220 defining the enclosed cavity 204 of FIG. 19.

Figure 22:
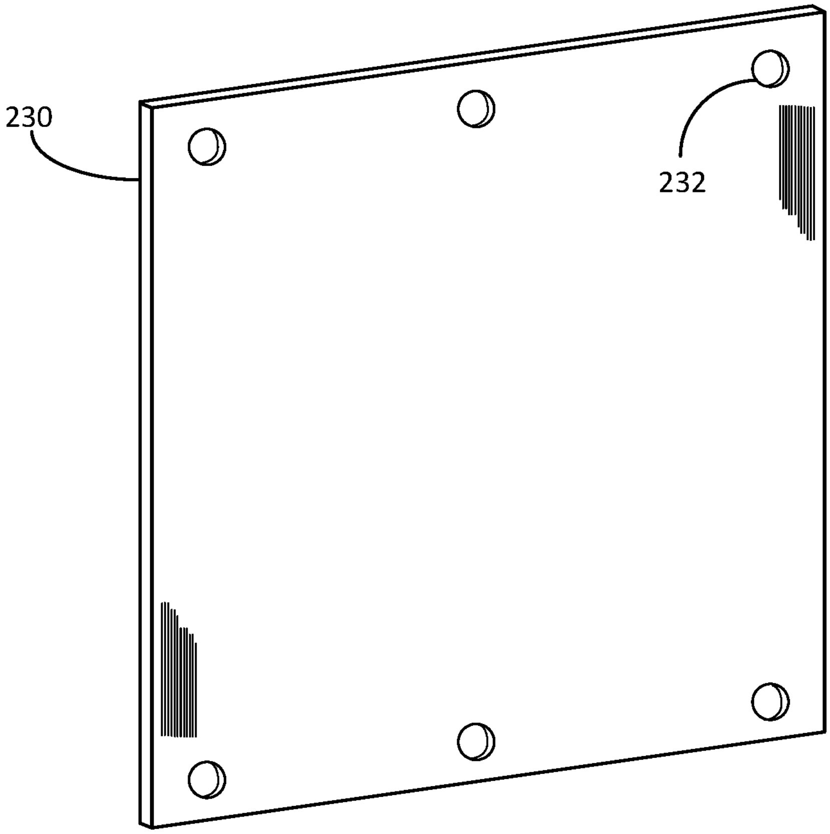
FIG. 22 is a perspective view of one embodiment of the rear plate.

In this embodiment, the external mounting brace 200 includes a total of six mounting channels 224, three across a top side of the brace and three across a bottom side of the brace. It is recognized that any number of channels or other securing means may be used and the six illustrated via FIGS. 21-22 are exemplary in nature.

For additional security of the external mounting brace secured to the door, one embodiment may include a back plate affixed to the back side of the door. FIG. 22 illustrates a perspective view of one embodiment of a back plate 230.

This plate 230 is a single unitary piece of material with a plurality of apertures 232. In this embodiment, the plate 230 can be affixed against the backside of the door, with fasteners (not shown) extending through the apertures 232, subsequently mating with the mounting channels 224 of FIGS. 20-21.

The plate 230 is one exemplary embodiment, but it is recognized that any other suitable variation can be used. For example, one embodiment may include two plates horizontally aligned, a top plate for mating with upper mating elements on the external mounting brace and a bottom plate for mating with lower mating elements. In another example, the plate 230 may include three plates vertically aligned with the mating elements. In another example, the plate 230 may include one plate as a secured backing for each of the mating elements, e.g. in this case using six separate plates each with a single aperture.

Installation of the door pull assembly can include using a template or other means for controlling modifications to the door. For example, a template placed over the front portion of the door can indicate where to remove elements of the front side of the door, allowing the enclosed cavity to fit within the door itself. The template could extend around the door and include alignment holes for drilling out the rear side of the door for connecting fasteners to hold external mounting brace in place.

When the door skin is removed and the interior of the door is exposed, the external mounting brace can be inserted in contacting engagement with the door. The enclosed cavity extends inward within the door.

Figure 23:
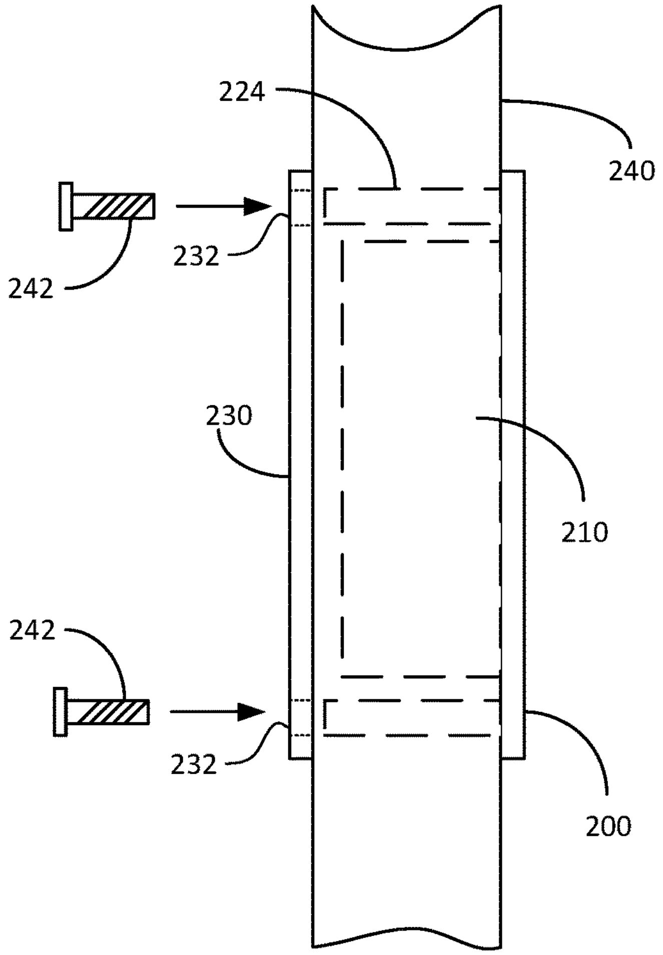
FIG. 23 is a side view illustrating installation of the external mounting brace within a door.

FIG. 23 illustrates one embodiment of a side view of a door 240 having the external mounting brace 200 secured thereon. In this embodiment, the mounting brace 200 is secured by fasteners 242 extending through the back plate 230 and engaging mounting channels 224, show in relief. Also visible in relief, the side wall 210 extends into the interior of the door. As visible, the side wall 220, and thus the cavity (204 of FIG. 18) does not extend all the way through the door 240. Therefore, in this embodiment, if the brace 200 is removed, access to the rear of the door is still prohibited.

Once the brace is secured in place, such as by connecting fasteners via the rear plate, further installation makes up this embodiment of the door pull assembly. Installation of the door pull assembly includes affixing a mounting assembly within the enclosed cavity. For the sake of brevity, FIGS. 4-6 illustrate one embodiment of the mounting assembly. FIG. 12 illustrates one embodiment securing the mounting assembly within the mounting brace. The FIG. 12 description is relative to interior bracing assembly (162), but the same installation technique is applicable to the external mounting brace 200.

For example, as the mounting assembly (e.g. mounting assembly 110 of FIG. 4) is placed within the enclosed cavity (206 of FIG. 19), fasteners can be inserted therethrough and engaging with a fastener mating element (212 of FIG. 21). In the example of the fastener mating element being a threaded aperture, the fastener can be a screw or bolt secured in place by the threaded engagement.

Once the mounting assembly is secured within the enclosed cavity, the pull handle is then affixed within the mounting assembly. Again for the sake of brevity, the pull handle may be the handle 130 of FIGS. 7-8 and FIGS. 9-11 as described above. Installation of the handle into the mounting assembly is described above, including for example with reference to FIGS. 13-14.

Figure 24:
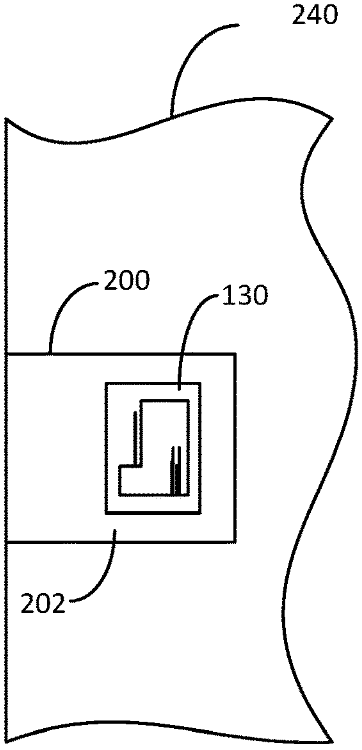
FIG. 24 illustrates a partial front view of a door having the door pull assembly mounted thereon.

For further illustration, FIG. 24 illustrates a front view of the door 240 having the external mounting brace 200 secured thereto. The front face 202 is secured against the front portion of the door. Installed within the enclosed cavity is the mounting assembly (not visible) and the pull assembly 130.

Figure 25:
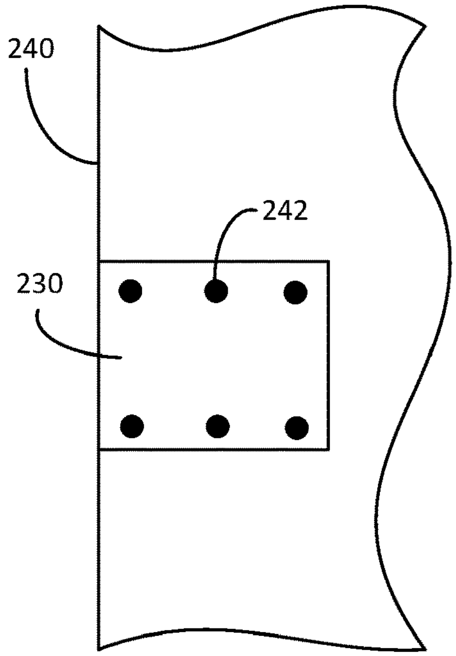
FIG. 25 illustrates a partial rear view of the door having the door pull assembly mounted thereon.

FIG. 25 illustrates one embodiment of the rear side of the door 240. The rear side of the door 240 includes the rear plate 230 attached using multiple fasteners 242. Similar to the side view of FIG. 23, the fasteners 242 mate with corresponding mating elements 224 of the external mounting brace.

Figure 26:
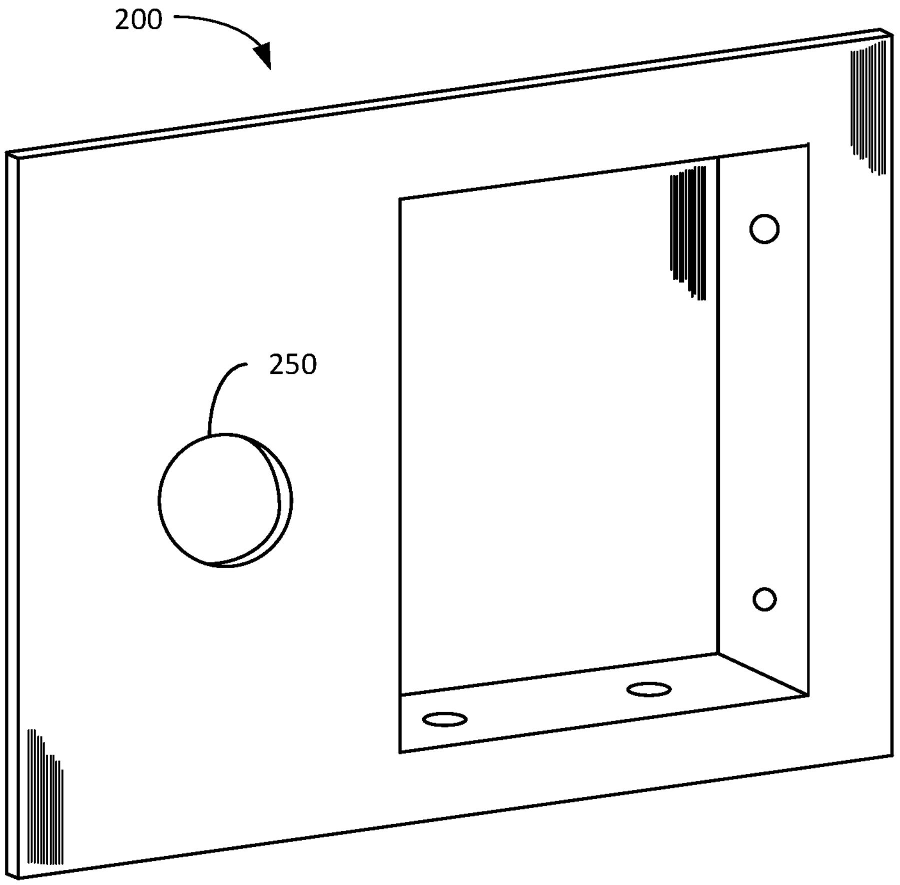
FIG. 26 illustrates a perspective view of another embodiment of the external mounting brace.

FIG. 26 illustrates another embodiment of the external mounting brace 200, in this embodiment including a cylinder cut-out 250. In this embodiment, the brace 200 connects to the door same as described in embodiments above. Whereas, the door may additionally include a lock set for locking/unlocking the door. For example, the door may be pre-fabricated with a lock opening and an interior channel bore to engage with a door frame, consistent with known techniques.

Upon installation of the mounting brace 200, a lock can be inserted within the cylinder cut-out 250. Therefore the door can both have the pull assembly described herein and a locking mechanism for additional security. Varying embodiments may include multiple locks if desired.

In different embodiments, the rear plate (not illustrated) may also include varying cylinder cut-out options. For example, if the locking mechanism is designed as a full pass-through, accessible on both sides, the rear plate may include a corresponding cylinder cut-out. Whereas, the door pull assembly provides improved and enhanced security prohibiting access to the rear side of the door, a single-side locking mechanism can be used to maintain restricted access to the rear side of the door. Another embodiment may be a cylinder only on the back panel for an interior locking mechanism not accessible from the front side of the door.

The present door pull assembly improves security by prohibiting access to the rear side of a door but allowing for installation of a pull assembly. The present door pull assembly using the external mounting brace provides for modifications of existing doors. A user does not need to replace existing doors, but can modify the existing doors by using a template or other means to cut out a channel on a front side of the door. The external mounting brace is secured within the channel. The mounting assembly then placed within the external mounting brace and the pull assembly mounted inside the mounting brace.

The door pull assembly further accommodates varying embodiments with door access features which may be present on the front side and/or rear side of the door. Doors in high traffic areas may use push-bars to control egress. For example, doors in schools, public buildings, movie theaters, public venues, etc., use push bars to ensure egress is available in an emergency situation, such as large crowds needing to evacuate.

These push bars can be disengaged so the door is in a position free for being pushed open. These bars can also be engaged so the door cannot be opened without depressing the push bar. In this case, the push bar is located on the rear of the door, so when disengaged, a person can use the door pull assembly to simply pull open the door. When the push bar is engaged, a user cannot open the door from the front by pulling on the handle portion of the assembly face of the pull assembly. Whereas, users exiting the building can readily depress the push bar and exit.

In this embodiment with a push bar, the external mounting brace does not extend all the way through the door so it does not impede the push bar. In embodiments using a rear plate, the push bar may be installed on top of the rear plate. In other embodiments, the rear plate may be modified to accommodate the push bar, such as having bolt holes or other modifications.

Therein, the present door pull assembly provides for modifications of existing doors and installing the pull assembly while maintaining security and integrity of the door with prohibited access to the rear side of the door.

It is further recognized that alternative embodiments may be realized relating to the positioning of the mounting flange(s) and fasteners. While illustrated herein having 2 mounting flanges, it is recognized that any number of mounting flanges may be utilized and the position of the mounting flanges may be adjusted as recognized by one skilled in the art. In the preferred embodiment, the mounting flange(s) are positioned on a single side allowing for the pull assembly to be slid or positioned into place. It is recognized that based on tolerances and adjustment factors, multiple mounting flanges on neighboring or opposing sides may be utilized to further secure the pull assembly relative to the mounting assembly.

While the mounting assembly is described herein having a rectangular shape, it is recognized that varying shapes may be utilized and are within the scope of the present invention. Such rectangular shape, including for example curved or slightly rounded edges, provides a means for simplicity of installation by ensuring the pull assembly is not improperly mounted. But it is within the scope herein to include additional shapes for the mounting assembly, such as a circular, oval or oblong shape, wherein the mounting flanges may be disposed through flange mount openings.

Furthermore, while the inclusion of fasteners allow for the ease of installation and ease or removal of the mounting assembly and/or pull assembly, it is additionally recognized that mounting assembly is generally affixed to the door and the pull assembly is affixed to the mounting assembly. Therefore, varying embodiments may include the flush pull door handle to not be designed for removal, for example of the affixing is performed using a more permanent solution such as welding, high-strength glue, or other means.

In another embodiment, the pull handle itself may include an offset grip to allow for ease of gripping for opening the door. As noted above, the shape of the grip portion may also vary, such as having a triangle shape or cascading edges by way of example. In the embodiment described above, the shape of the pull portion of the pull assembly prohibits application of securing means to hold the doors together. For example, the flush pulls do not allow for placement of chains or ropes around the door. In the event someone attempted to place a clamp, the cut-away portion at the bottom of the grip portion provides a means for the doors to be agitated by pushing out and causing the clamp to slide down into the open gap and hence fall off the door.

In a further embodiment, the bracing assembly (e.g. element 162 of FIG. 12), can be formed as part of the door assembly. Many doors are constructed from frame members, also commonly referred to as stiles and rails. In some constructions, the frames are exposed frames with windows or other inserts therebetween.

Figure 27:
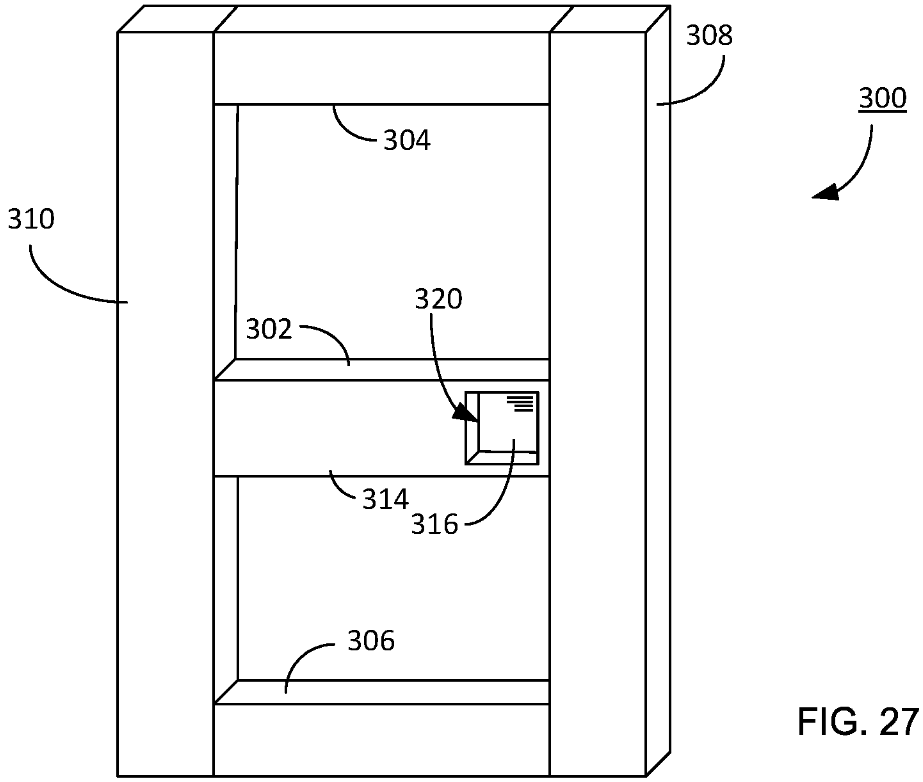
FIG. 27 illustrates a perspective view of a door having the bracing assembly therein.

In one example, the door can be made from aluminum, with extrusion processes used to form the frames using known extrusion techniques. These frames can then be secured to form the door. The frame and assembly herein can be constructed with an aluminum door, as any other door assembled using similar techniques or materials and is not expressly limited to aluminum stile and rail type doors FIG. 27 illustrates a door frame in accordance with one embodiment of the present invention, including elements not visible therein. The door 300 includes three horizontal frame members, also known as rails, a first horizontal frame member 302, a second horizontal frame member 304, and a third horizontal frame member 306. The door 300 additionally includes vertical frame members, also called stiles, including a first vertical frame member 308 and a second vertical frame member 310.

When constructed, the frame members are secured to each other using any number of suitable techniques. For example, the second and third horizontal members 304, 306, may be secured to the first vertical member 308 and the second vertical member 310 using a tongue-and-groove interlock. The securing may include fasteners, such as glue, welding, nails, screws, rivets, or any other securing means as recognized by one skilled in the art.

In the door 300, the first horizontal frame member 302 includes an interior cavity (not visible) extending from a front wall 314 of the member 302 to a rear wall 316 of the member 302.

In one embodiment, the rear wall 316 is the solid material of first horizontal frame member 302. Whereas, in the front wall 314, an aperture 320 exposes the internal cavity, allowing access to the rear wall 316. Moreover, while not visible in FIG. 27, the first horizontal frame member 302 includes brace members secured within the internal cavity, forming the bracing assembly, as described in greater detail below.

Figure 28:
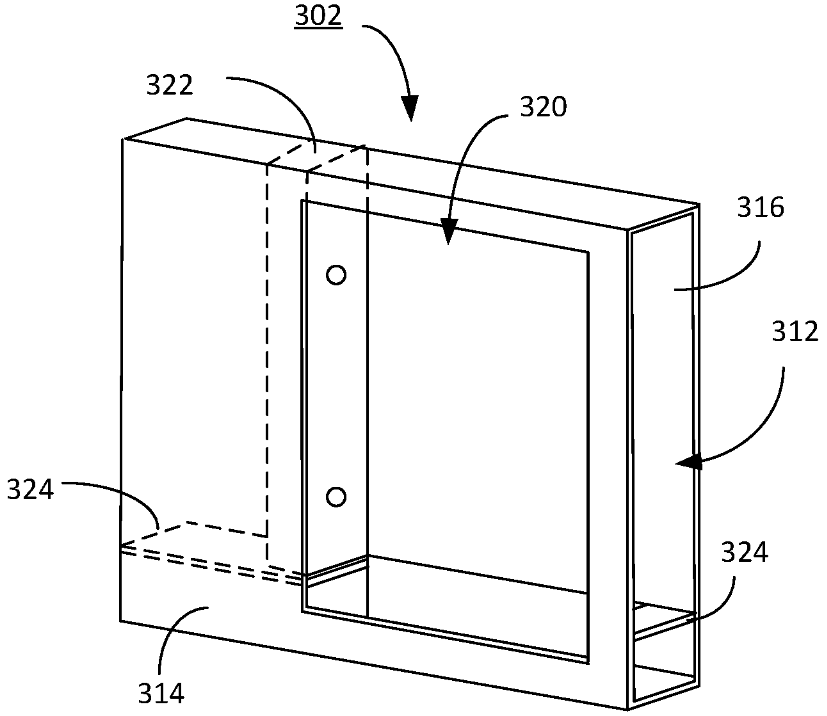
FIG. 28 illustrates a perspective view of one embodiment of a horizontal frame member.

FIG. 28 illustrates an exploded view of one embodiment of the horizontal frame member 302. The frame member 302 includes the front wall 314 and rear wall 316 with the interior cavity 312 therebetween. Also visible in FIG. 28, the aperture 320 on the front wall 314 allows access into the interior cavity 312.

FIG. 28 further (partially) illustrates a first brace member 322 secured within the internal cavity 312. In this embodiment, the frame member 302 includes a ridge element 324 running within the internal cavity 312. In this embodiment, the ridge element 324 does not run concurrent with the aperture 320.

The ridge element 324 provides a positional marker noting the location of the first brace member 322 within the internal cavity 312. The first brace member 322 is secured within the interior cavity 312 using any suitable securing means, including but not limited to glue, welding, other any means as recognized by one skilled in the art. For example, one embodiment may include a screw or other threaded member fed through a top aperture (not shown) and bottom aperture (not shown) of the horizontal member 302 that engages threaded mating apertures (not shown) within the brace member 322. In this example, the positioning of the apertures in the vertical member 302 and the mating apertures in the brace member 322 assists alignment and positioning of the brace member 322 within the interior cavity 312 and relative to the aperture 320.

Additionally, the position of the first brace member 322 defines a first side of the bracing assembly. As described in greater detail below, the bracing assembly receives the mounting assembly which receives the pull assembly therein.

Figure 29:
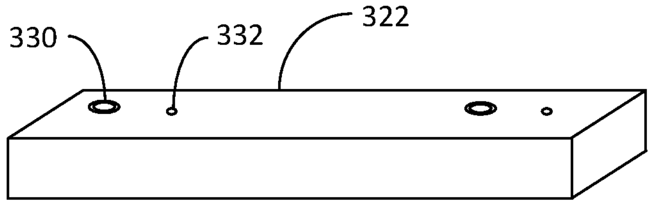
FIGS. 29 and 30 illustrate one embodiment of a brace member.
Figure 30:
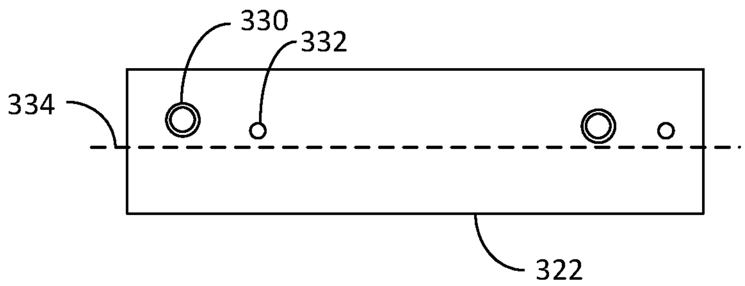

FIGS. 29 and 30 illustrate one embodiment of a brace member, such as brace member 322. FIG. 29 is a perspective view illustrating a general thickness of the member 322, including apertures 330 and 332. The apertures 330, in one embodiment, are pass-through holes, one embodiment including a beveled edge.

For example, in one embodiment the apertures 330 may be similar to apertures 174 of FIGS. 16-17 noted above. The apertures 332 may be, in one embodiment, threaded holes receiving a screw or other threaded element. Where the aperture provides for secure fastening, the aperture may include adding elements allowing for secure fastening. For example, if the fastener is a screw, the aperture may include threads for mating the screw. Other examples for fastener mating in conjunction with one or more apertures are known within the art and included within the scope herein.

FIG. 30 illustrates a top view of the brace member 322 with apertures 330 and 332. Further visible in FIG. 30, the apertures 330, 332 are offset relative to a centerline 334 of the member. The apertures 330, 332 offset accounts for the thickness of the rear wall (312 of FIG. 28) relative to a front side of the front wall (314 of FIG. 28).

Figure 31:
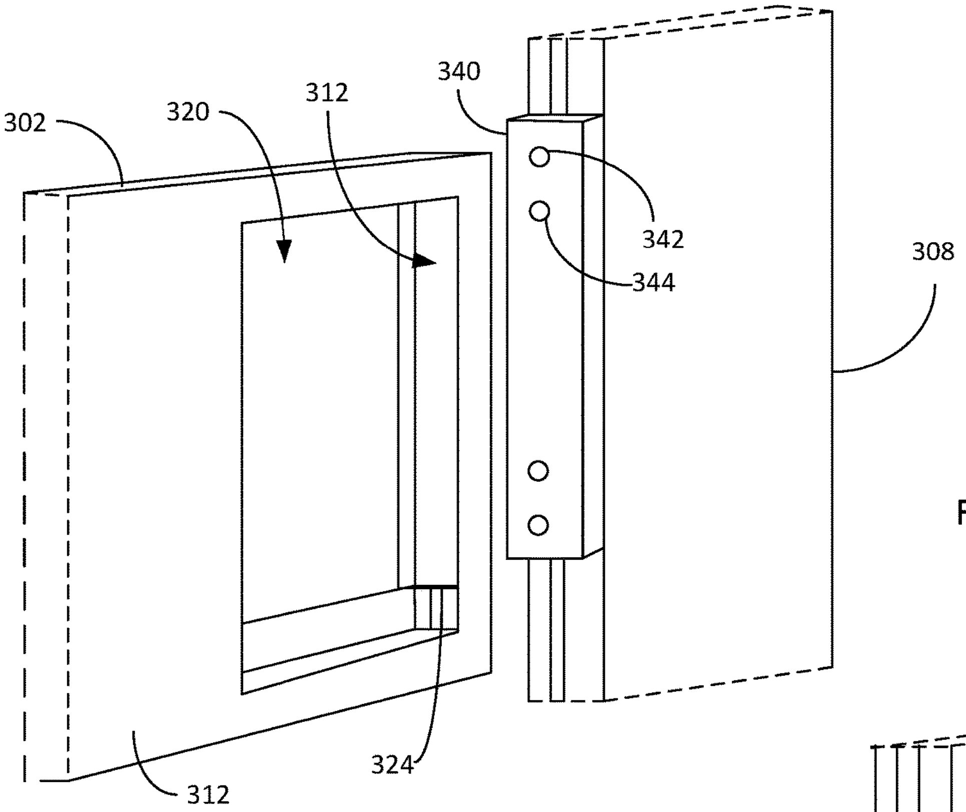
FIG. 31 illustrates a perspective view of a horizontal frame member prior to engagement with a vertical frame member.

FIG. 31 illustrates a perspective view of the horizontal frame member 302, prior to engagement with the vertical frame member 308. In the horizontal frame member 302, the ridge element 324 is in the internal cavity 312 prior to the aperture 320. Similar to FIG. 28, the aperture 320 extends from the front wall 314 of the member 302 to the rear wall 312.

The vertical frame member 308 includes a brace member 340 attached thereto. This brace member 340 may be similar or identical to the brace member 322 of FIGS. 29-30, including apertures 342, 344 for fasteners or securing posts passing therein.

Herein, the brace member 340 may include additional features or elements for secure engagement to the frame member 308. For example, one embodiment may include tongue and groove mating features engaging the brace member 340 to the frame member 308. In another example, screws, rivets, glue, welds, solder, or other techniques may be used to mate members 308 and 340. Therefore, in various embodiments, the brace members 340 and 322 may have similar apertures but vary on a back side, with member 340 include different means for being secured to the horizontal frame member 308.

Figure 32:
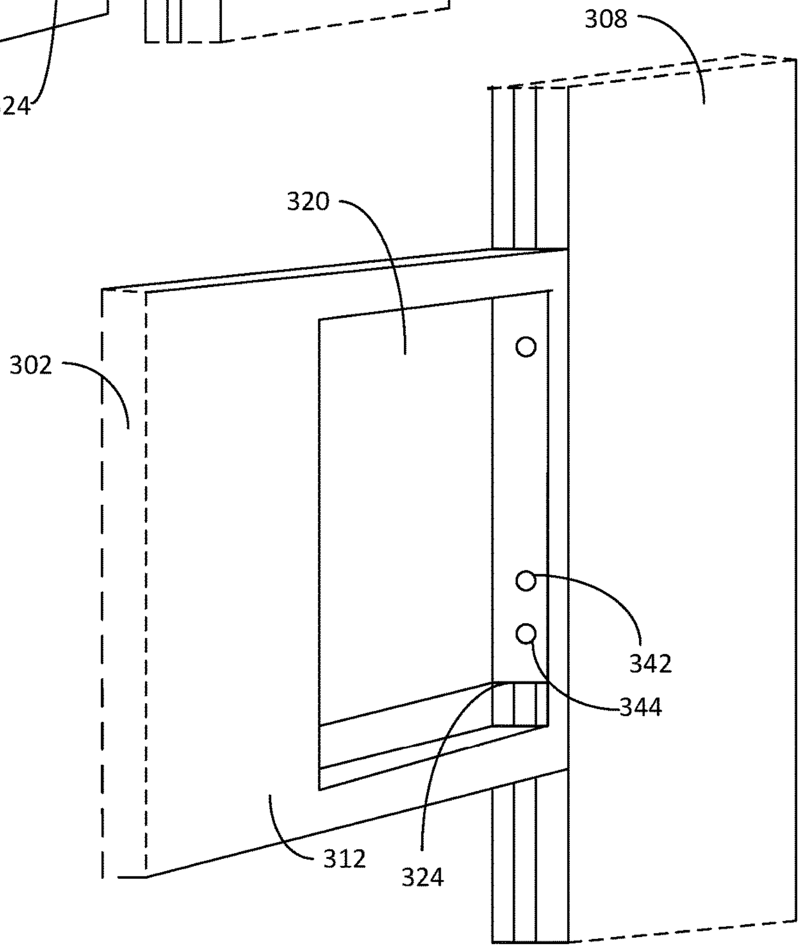
FIG. 32 illustrates a perspective of the horizontal frame member engaged with the vertical frame member.

FIG. 32 illustrates the engagement of the vertical frame member 308 with the horizontal frame member 302. This engagement facilitates the brace member 340 fitting within the internal cavity 312. In this embodiment, the block member 340 abuts relative to the ridge member 324.

In one embodiment, a plurality of fasteners can be inserted through the top and bottom of the horizontal brace member 302, the fasteners engaging brace member 340. In one example not expressly illustrated in FIGS. 31 and 32, one or more fasteners can be a threaded screw(s) fed through apertures on the top and bottom of the horizontal frame member 302, engaging mating threads on the top and bottom of the brace member 340. Similar to the embodiment of securing the first brace member 322 within the frame member 302 noted above, using screws or other threaded members, can additionally assist with the alignment of the brace member 340 within the internal cavity 312 and relative to the aperture 320.

The horizontal member 302 secured to the vertical member 308 with the brace member 340 in the internal cavity 312 forms another part of the bracing assembly. The horizontal member 302 includes the brace member 322 on the opposing side of the aperture 320 (e.g. FIG. 28). The bracing assembly is then formed based on these two brace members 322, 340, within the internal cavity 312, as well being defined by the rear wall (316 of FIG. 28).

Herein, the bracing assembly then operates similar to the bracing assembly 162 of FIG. 12. The bracing assembly includes features for receiving the mounting assembly (e.g. 110 of FIG. 2). The mounting assembly can be secured to the bracing assembly by secure engagement of fasteners into apertures 330, 332, 342, and/or 344 of bracing members 322 and 340 respectively. With the mounting assembly secured in place, the pull assembly (e.g. the pull assembly 130 of FIG. 8, is then securable to the mounting assembly.

Assembling and securing the mounting assembly into the bracing assembly is consistent with techniques described above. Similarly, assembling and securing the pull assembly into the mounting assembly is consistent with techniques described above.

FIGS. 29 and 30 reference the centerline 334 offset of apertures 330, 332. This offset accounts for material thickness, aligning the placement of the mounting assembly and the pull assembly within the door, generating a flush placement of the pull assembly relative to the front wall of the door. As visible in FIG. 28, the depth of the aperture 320 includes the thickness of the front wall 314. Where the aperture stops at the rear wall 316, a centerline of the interior cavity 312 is closer to the front side of the front wall 314 than the rear wall 316. Therefore, offsetting the apertures 330, 332 account for the thickness of the front wall 314.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

What is claimed is:

1. A door comprising:

a first horizontal frame member having a rear wall, a front wall, and an interior cavity extending between the rear wall and the front wall, the front wall having an aperture therein granting access to the interior cavity and to the rear wall;

a first brace member vertically secured and extending within a first vertical side of the interior cavity of the first horizontal frame member, the first brace member including at least one fastener engagement element, wherein the first brace member being secured within the interior cavity and is positioned to form a first side of a bracing assembly disposed within the interior cavity, such that the bracing assembly is accessible via the aperture;

a first vertical frame member having a first side engageable to the first horizontal frame member; a second brace member secured to the first side of the first vertical frame member such that when the first vertical frame member engages the first horizontal frame member, the second brace member is vertically secured within a second vertical side of the interior cavity of the first horizontal frame member and forms a second side of the bracing assembly accessible via the aperture, the second brace member including at least one fastener engagement element, wherein the first brace member being vertically secured within the first vertical side of the interior cavity is spaced on an opposing vertical side of the aperture from the second vertical side, the first brace member extending vertically in the same plane as the second brace member, the second side of the bracing assembly, formed by the second brace member, is located in opposition to the first side of the bracing assembly formed the first brace member;

a mounting assembly including a plurality of fastener elements, the mounting assembly affixed within the bracing assembly by engaging at least one of the plurality of fastener elements with the at least one fastener engagement element of the first brace member and by engaging at least one of the plurality of fastener elements with the at least one fastener engagement element of the second brace member;

a pull assembly including an assembly interior portion having a first interior side and a second interior side, the first interior side having at least one flange mount opening; and the pull assembly including an assembly face having a handle portion flush with the assembly face and protruding across at least a portion of the assembly interior portion for allowing a pulling action on the pull assembly;

wherein the pull assembly mounts in the mounting assembly within the bracing assembly of the first horizontal frame member.

2. The door of claim 1 further comprising:

a ridge element disposed within the interior cavity of the first horizontal frame member, wherein a positioning of the first brace member and the second brace member within the interior cavity are in relation to the ridge element.

3. The door of claim 1 further comprising:

a second vertical frame member;

a second horizontal frame member disposed at a top end of the door secured and between with the first vertical frame member and the second vertical frame member; and a third horizontal frame member disposed at a lower end of the door and secured between with the first vertical frame member and the second vertical frame member.

4. The door of claim 1, wherein the first brace member is secured within the interior cavity of the first horizontal frame member using a first screw passing through at least one of a top of the first horizontal frame member and a bottom of the first horizontal frame member and the first screw contactingly engaging a threaded aperture within the first brace member.

5. The door of claim 4, wherein the second brace member is secured within the interior cavity of the first horizontal frame member using a second screw passing through at least one of the top of the first horizontal frame member and the bottom of the first horizontal frame member and the second screw contactingly engaging a threaded aperture within the second brace member.

6. The door of claim 1, wherein the first vertical frame member and the first horizontal frame member are composed of aluminum.

7. The door of claim 1, wherein the at least one fastener engagement element of the first brace member is disposed offset from a center vertical center line and the offset coincides with a thickness of the first vertical frame member.

8. A door comprising:

a first horizontal frame member having a rear wall, a front wall, and an interior cavity extending between the rear wall and the front wall, the front wall having an aperture therein granting access to the interior cavity and to the rear wall;

a first brace member secured within the interior cavity of the first horizontal frame member, the first brace member including at least one fastener engagement element, wherein the first brace member being secured within the interior cavity and is positioned to form a first side of a bracing assembly;

a first vertical frame member having a first side engageable to the first horizontal frame member; and a second brace member secured to the first side of the first vertical frame member such that when the first vertical frame member engages the first horizontal frame member, the second brace member is secured within the interior cavity of the first horizontal frame member and forms a second side of the bracing assembly, the second brace member including at least one fastener engagement element;

wherein the second brace member is secured to the first vertical frame member prior to the first vertical frame member being secured to the first horizontal frame member.

9. The door of claim 8 further comprising:

a mounting assembly including a plurality of fastener elements, the mounting assembly affixed within the bracing assembly by engaging at least one of the plurality of fastener elements with the at least one fastener engagement element of the first brace member and by engaging at least one of the plurality of fastener elements with the at least one fastener engagement element of the second brace member.

10. The door of claim 9 further comprising:

a pull assembly including an assembly interior portion having a first interior side and a second interior side, the first interior side having at least one flange mount opening; and the pull assembly including an assembly face having a handle portion flush with the assembly face and protruding across at least a portion of the assembly interior portion for allowing a pulling action on the pull assembly;

wherein the pull assembly mounts in the mounting assembly within the bracing assembly of the first horizontal frame member.

11. The door of claim 8 further comprising:

a ridge element disposed within the interior cavity of the first horizontal frame member, wherein a positioning of the first brace member and the second brace member within the interior cavity are in relation to the ridge element.

12. The door of claim 8 further comprising:

a second vertical frame member;

a second horizontal frame member disposed at a top end of the door secured and between with the first vertical frame member and the second vertical frame member; and a third horizontal frame member disposed at a lower end of the door and secured between with the first vertical frame member and the second vertical frame member.

13. The door of claim 8, wherein the first brace member is secured within the interior cavity of the first horizontal frame member using a first screw passing through at least one of a top of the first horizontal frame member and a bottom of the first horizontal frame member and the first screw contactingly engaging a threaded aperture within the first brace member.

14. The door of claim 13, wherein the second brace member is secured within the interior cavity of the first horizontal frame member using a second screw passing through at least one of the top of the first horizontal frame member and the bottom of the first horizontal frame member and the second screw contactingly engaging a threaded aperture within the second brace member.

15. The door of claim 8, wherein the first vertical frame member and the first horizontal frame member are composed of aluminum.

16. The door of claim 8, wherein the at least one fastener engagement element of the first brace member is disposed offset from a center vertical center line and the offset coincides with a thickness of the first vertical frame member.

* * * * *